United States Patent Office 3,487,689
Patented Jan. 6, 1970

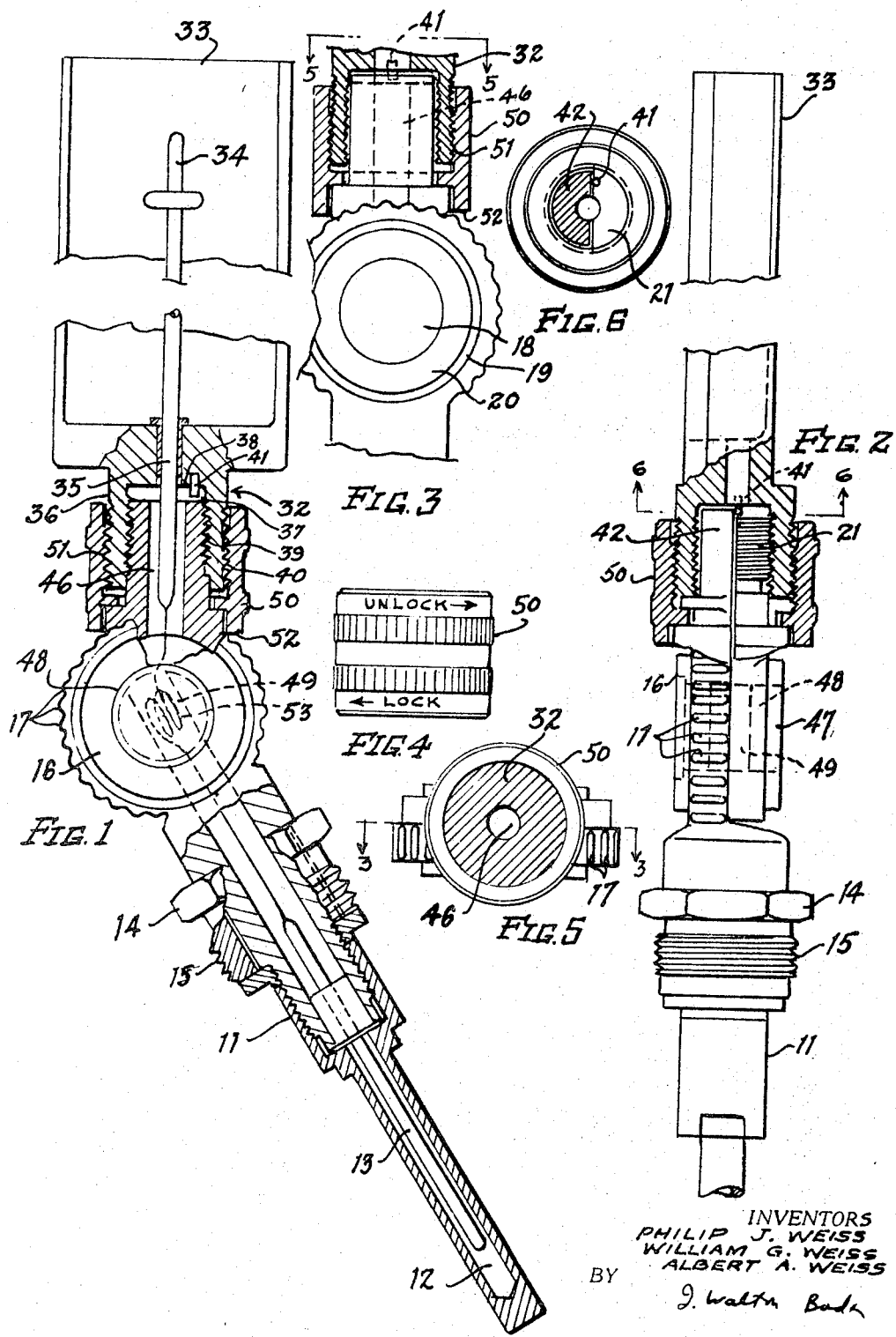

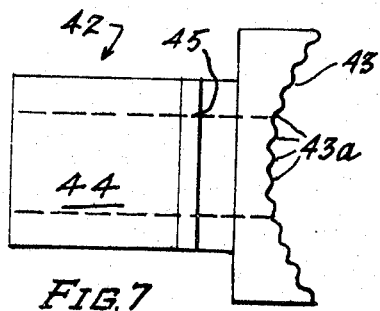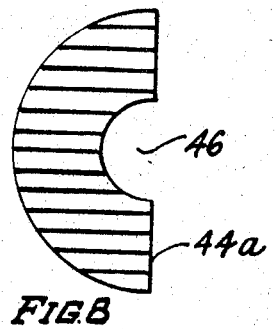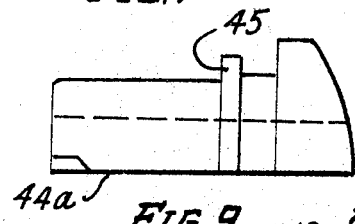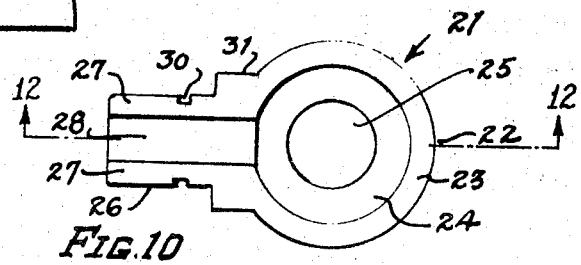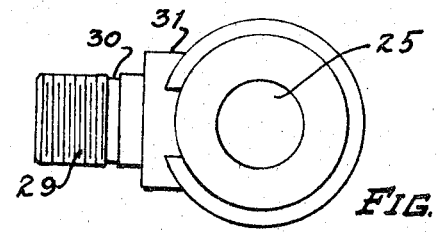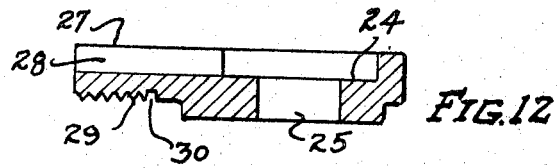

3,487,689
POSITIONING APPARATUS FOR THERMOMETERS
AND THE LIKE
Philip J. Weiss, 730 Silver Lake Place, and William G.
 Weiss, 844 Stanton Ave., both of Baldwin, N.Y. 11510,
 and Albert A. Weiss III, 57 Vincent Place, Lynbrook,
 N.Y. 11563
Filed Feb. 20, 1967, Ser. No. 617,227
Int. Cl. G01k 1/14
U.S. Cl. 73—339        7 Claims

ABSTRACT OF THE DISCLOSURE

Positioning apparatus is shown designed to position a thermometer or the like into a variety of positions. The apparatus includes a first support and a second support. Attached to the top of the first support is a first circular member having a central opening, a dished inner face and a toothed perimeter. Abutting the inner face of the first circular member is a second circular member also having a central opening and a dished inner face but having a smooth perimeter. An arcuate cut-out portion is provided within the first support to accommodate the smooth perimetrical portion of the second circular member. A pin passes through the mating central openings of the first and second circular members and secures the same to one another.

The second support bears a hollow circular projection. This projection has a base portion and threaded inner and outer perimetrical surfaces. At the base of the interior of the projection a forwardly projecting pin is disposed. A circular nut having threaded inner and outer perimetrical surfaces is threadedly connected to the outer threaded surface of the above-named projection. A first half bolt having a smooth flat inner face and a semi-circular threaded outer face is connected to the perimeter of the second circular member and projects therefrom. A second half bolt also having a smooth flat inner face, a smooth semi-circular outer face and a toothed arcuate top portion is provided. The teeth of the top portion are selectively meshable with the teeth of the first circular member. The inner faces of the first and second half-bolts are abuttable with one another. Both half bolts are insertable into the hollow circular projection of the second support. The threads of the first half bolt are meshable with the threads on the inner perimetrical surface of the projection on the second support. The second half bolt lies to the side of the pin and the first half bolt lies atop the pin.

DESCRIPTION OF THE INVENTION

This invention relates to positioning apparatus which is utilized to position one member with respect to another. It has particular application to the positioning of various gauges which are utilized to determined the condition of various processes. For example, in laboratory apparatus, boilers, factory apparatus, and the like it is, many times, necessary to position the gauge on the device itself at various angles depending upon who must read the gauge. For example one operator of the apparatus may be of short stature, the other of tall stature, various types of differing sensing means may be utilized requiring different angles of viewing, or, for various other reasons, the positioning of the gauge relative to the piece of apparatus must be changed. Generally the changed position is maintained so long as the conditions requiring the change are present. Thus, for example, an operator of short stature replacing an operator of taller stature as a boiler watcher, for example, would position the gauge involved, such as a pressure gauge or a thermometer, to suit his convenience. The gauge would be maintained in that position until this operator went off duty. At that time, for example, if the new operator were one of taller stature he would then put the gauge position to suit his convenience.

For this reason it is necessary to produce positioning apparatus which can be easily switched from one position to another but, at the same time, must be maintained in the selected position for a considerable period. It is also required that the positioning apparatus be simple and foolproof in operation and, at the same time, be relatively inexpensive to manufacture.

The positioning apparatus described in this application is simple and foolproof in operation. It is relatively inexpensive to construct and manufacture. It permits a very simple and quick adjustment of the positioning of the gauge involved with a minimum of effort and permits the gauge to be retained in that position for an indefinite period. On the other hand it permits a rapid and simple change of the position if that is desired.

The invention may be briefly described as comprising a first support. A first circular member having a toothed perimeter is secured to and projects from the first support. A second circular member having a smooth perimeter is also provided. Both of these circular members each have smooth abutting inner faces and are provided with registering openings therewithin. A pin passes through the registering opening and secures the circular members to one another. A first half bolt having a smooth flat inner face and a threaded semi-circular outer face is secured to and projects from the second circular member. A second half bolt having a flat inner face and a smooth semi-circular outer face and an arcuate toothed portion is also provided. The inner faces of the first and second half bolts are abuttable with one another and the toothed portion of the second half bolt is selectively abuttable with the toothed perimeter of the first circular member. A second support having a hollow circular projection, a base portion, and a threaded interior perimetrical portion is also provided. Both half bolts are disposable within the interior peripheral portion of the projection on the second support and the threads upon the first half bolt are meshable with the threads within the interior peripheral portion of the projection. Means are also provided for causing the toothed portion of the second half bolt to mesh with the toothed perimeter of the first circular member. The structure of the device is such that the first and second supports can be placed in various positions with respect to one another but, at the same time, selectively retained in fixed position.

The above constitutes a brief description of the instant invention and some of the objects and advantages thereof. Various other objects and advantages of this invention will become apparent to a reader of this specification as the description proceeds.

The invention will now be further described by reference to the accompanying drawings which are made a part of this specification. At this point, however, the reader is cautioned to note that the specific form of this invention as set forth in the drawings herein and described in this specification is for illustrative purposes and for purposes of example only. Various changes and modifications could be made to this invention without departing from the spirit and scope thereof.

Now referring to the drawings in detail:

FIG. 1 is a front view, partly in section, of the positioning device of this invention with a thermometer attached to the first support and thermometer controlling means attached to the second support.

FIG. 2 is a side view, partly in section, of the form of invention shown in FIG. 1.

FIG. 3 is a sectional view taken along lines 3—3 of FIG. 5.

FIG. 4 is a detail front view of the nut member of this invention.

FIG. 5 is a sectional view taken along lines 5—5 of FIG. 3.

FIG. 6 is a sectional view taken along lines 6—6 of FIG. 2.

FIG. 7 is a detail front view, on an enlarged scale, of the second half bolt member of this invention.

FIG. 8 is a top plan view, on an enlarged scale, of the structure shown in FIG. 7.

FIG. 9 is a side view, on an enlarged scale, of the structure shown in FIGS. 7 and 8.

FIG. 10 is a detail front interior view of the first half bolt member and the second circular member.

FIG. 11 is an exterior front view of the structure shown in FIG. 10.

FIG. 12 is a sectional view taken along lines 12—12 of FIG. 11.

Now referring to the drawings in detail for a detailed description of this invention, a first support 11 is shown. First support 11 bears a hollow portion 12 within which is a thermometer sensing means 13. This may be, for example, a mercury or alcohol supply vessel, a thermistor probe, and the like.

Secured to support 11 is a nut 14 which bears a threaded portion 15. Threaded portion 15 may be secured to any appropriate structure.

Secured to the top of first support 11 is first circular member 16 which has a toothed perimeter 17. Member 16 is also provided with a central opening 18 thereupon, a smooth flat inner face 19 and a dished portion 20. A second circular member 21 is also provided. Second circular member 21 includes a smooth perimeter 22, a smooth inner face 23 and a dished portion 24. Member 21 is also provided with a central opening 25.

Projecting from member 21 is a half-bolt 26 which is provided with a smooth inner face 27 and provided with a recess 28 therewithin. The outer perimetrical face of bolt 26 is threaded at 29.

Bolt 26 also includes a recess 30 and a shelf portion 31.

A second support 32 is also provided and includes a thermometer holding portion 33 to which is secured a thermometer 34. Second support 32 also includes a recess 35 through which thermometer 34 passes and a forwardly extending projection 36. Projection 36 is hollow containing a recess 37 which includes a base portion 38. The interior peripheral portion 39 of projection 32 is threaded and the outer perimetrical face 40 of projection 32 is likewise threaded.

A pin 41 is secured to the base portion of the interior of projection 32.

A second half-bolt member 42 contains an upper arcuate portion 43. Portion 43 is equipped with teeth 43a which are adapted to mesh with teeth 17. Member 42 also bears a half stem portion 44 which is formed with a flat inner face 44a and a shelf portion 45. Member 42 is also provided with a recess 46 therewithin which is adapted to join recess 28 within member 21.

A nut member 50 is also provided having a threaded portion 51 on its interior perimetrical portion which is adapted to mesh with the threads on the outer perimetrical portion of projection 32. Nut 50 also includes a shelf portion 52 which is designed to abut shelf portions 45 and 31 of members 42 and 21.

A pin 48 is provided which is adapted to pass through openings 18 and 25. Pin 48 also bears a hole 49 through which sensing means 53 may pass.

Pin 48 also bears a roof portion 47 thereupon.

In order to retain pin 48 in position it is preferably press fitted into the respective parts.

With the foregoing specific description the operation of this invention may now be explained. In this connection the specific form of the invention will be utilized which includes a thermometer connected to the second support.

The device is assembled by taking member 42 and placing it within member 50 so that shelf portion 45 underlies shelf portion 52. Member 26 is then also placed within member 50 so that the abutting portions of members 26 and 42 are in position. Faces 28 and 44a of members 42 and 21 are then placed in abutting relationship with one another. Pin 48 is then placed into openings 18 and 25. Pin 48 is preferably a "press fit" and the parts are then fitted together in a press.

It is noted that shelf portions 31 and 45 are in abutting relationship with shelf portion 52 of nut 50. Shelf portion 45 of member 42 lies on one side of shelf portion 52 and shelf portion 31 of member 21 lies on the opposite side of shelf portion 52. As a result the projection of half-bolt members 42 and 26 are of different lengths thereby permitting pin 41 to lie alongside half-bolt section 42 but to underlie half-bolt portion 26.

After the parts are fitted together, as set forth above, nut member 50 is secured into place against the corresponding parts.

Obviously, by this construction, nut member 50 locks and unlocks the parts. In locked position the parts cannot move with respect to one another. In unlocked position the parts may move pivotally in any direction but cannot move axially beyond a radius more than 180° because of the presence of pin 41. This is important since, when sensing means are placed between the two (2) parts of the device, a movement beyond 180° would, of course, "snap off" the sensing means.

The foregoing sets forth the manner in which the objects of this invention are achieved.

We claim:

1. A positioning device comprisng a first support, a first circular member having a toothed perimeter secured to and projecting from said first support, a second circular member having a smooth perimeter, said circular members each having abutting flat inner faces and provided with registering openings therewithin, a pin securing said circular members to one another and passing through said registering openings, a first half-bolt having a smooth flat inner face and a threaded semi-cylindrical outer face secured and projecting from said second circular member, a second half-bolt having a flat inner face, a smooth semi-cylindrical outer face and an arcuate toothed portion, the inner faces of said first and second half bolts being abuttable with one another and the toothed portion of said second half-bolt being selectively abuttable with the toothed perimeter of said first circular member, a second support operatively connected to said first support and having a hollow cylindrical projection thereupon, said projection also having a threaded interior peripheral portion, said half-bolts being disposable within said interior peripheral portion of said projection and said threads upon said first half-bolt being meshable with the threads within said interior peripheral portion of said projection, and means for causing said toothed portion of said second half-bolt to mesh with said toothed perimeter of said first circular member.

2. A positioning device as described in claim 1 the means for causing said toothed portion of said second half-bolt to mesh with the toothed perimeter of said first circular member constituting a threaded outer perimetrical portion upon the projection of the second support, and a circular nut having a threaded inner perimetrical portion meshable with the said threaded outer perimetrical portion of said projection.

3. A positioning device as described in claim 2 including a first shelf portion within said nut and second mating shelf portions upon said first and second half-bolts.

4. A positioning device as described in claim 3 including a projecting pin secured to the second support within the hollow projection thereof, said pin lying alongside said second half-bolt and below said first half-bolt, 5. A positioning device as described in claim 4 including a dished portion abutting the inner face of each of said circular members.

6. A positioning device as described in claim 5 including a thermometer holding member secured to said second support.

7. A positioning device as described in claim 6 including a thermometer within said thermometer holding member and means for carrying sensing means through said first support, said second support and said pin.

References Cited

UNITED STATES PATENTS

| 737,951 | 9/1903 | McEachern | 287—14 |
| 3,079,798 | 3/1963 | Weiss et al. | 73—368 |

LOUIS R. PRINCE, Primary Examiner

D. E. CORR, Assistant Examiner

U.S. Cl. X.R.

73—374; 287—14